(No Model.) 2 Sheets—Sheet 2.
W. C. HOUSER.
CORN HARVESTER.
No. 473,840. Patented Apr. 26, 1892.
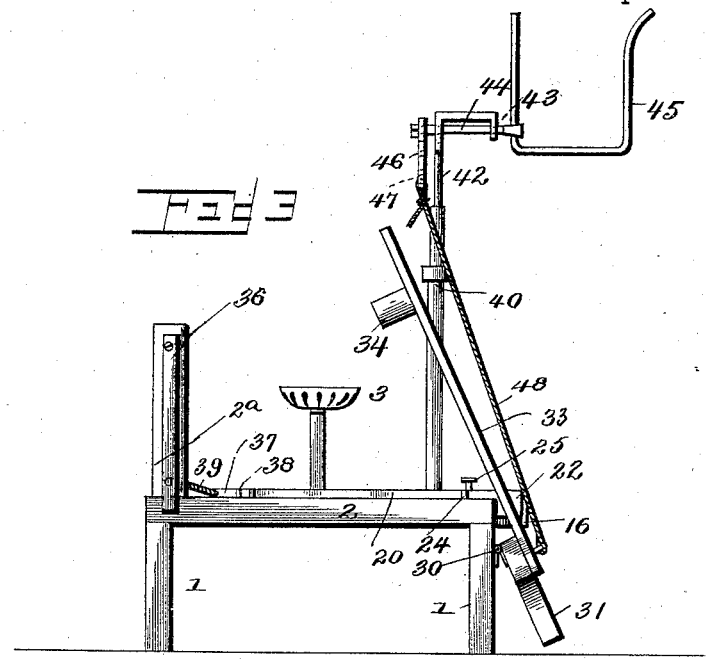
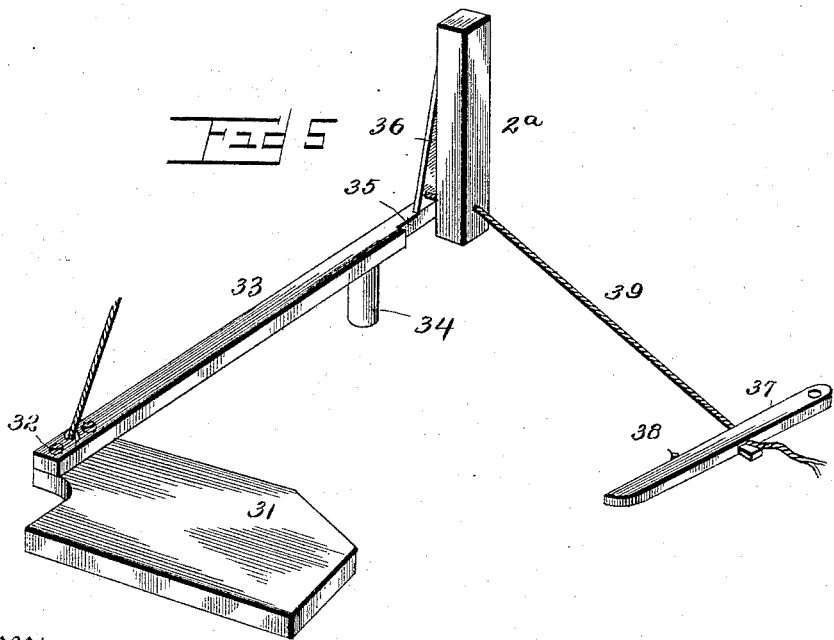
Witnesses:
John Dinnie
Mark Marey
Inventor:
William C. Houser,
By his Attorneys
Collamer & Co.
THE NORRIS PETERS CO., PHOTO-LITHO., WASHINGTON, D. C.

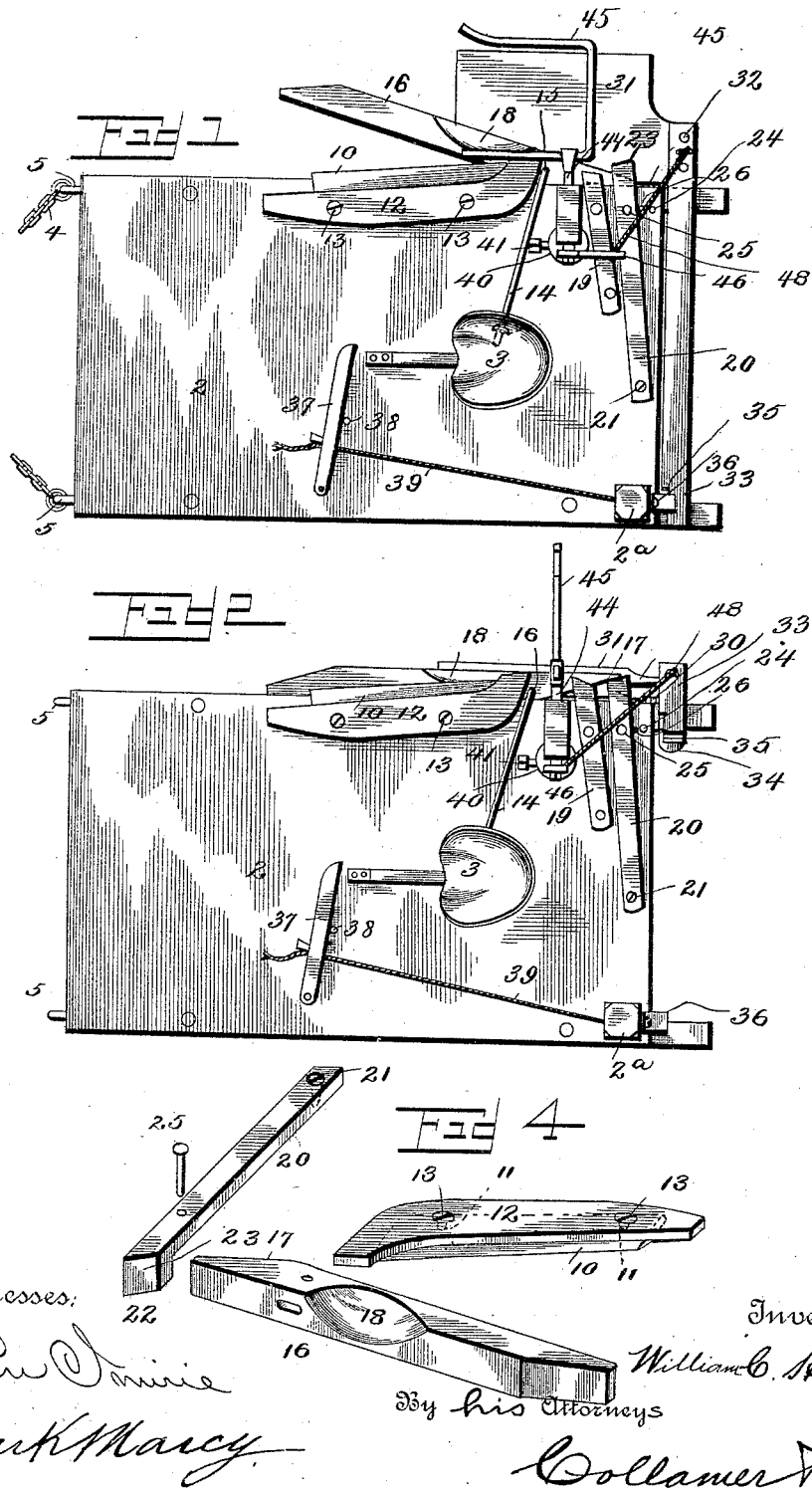

UNITED STATES PATENT OFFICE.

WILLIAM C. HOUSER, OF UTICA, OHIO.

CORN-HARVESTER.

SPECIFICATION forming part of Letters Patent No. 473,840, dated April 26, 1892.

Application filed January 4, 1892. Serial No. 416,953. (No model.)

*To all whom it may concern:*

Be it known that I, WILLIAM C. HOUSER, a citizen of the United States, residing at Utica, in the county of Licking and State of Ohio, have invented certain new and useful Improvements in Corn-Harvesters; and I do hereby declare the following to be a full, clear, and exact description of the invention, such as will enable others skilled in the art to which it appertains to make and use the same.

This invention relates to harvesters of that class adapted for the cutting and shocking of corn or other stalks; and the object of the same is to effect certain improvements in machines of this character, especially by simplifying and cheapening their construction.

To this end the invention consists in the construction more fully hereinafter described and claimed, and as illustrated in the accompanying drawings, wherein—

Figure 1 is a plan view of this machine ready for operation. Fig. 2 is a similar view with the table dumped and the finger turned in. Fig. 3 is a rear elevation of Fig. 2. Fig. 4 is a perspective detail of the knife detached, the finger, and the catch for the finger. Fig. 5 is a similar detail of the table, its lever, and the trip and foot lever therefor.

This machine comprises the main frame, which may be mounted on a wheeled base, although I have shown it as upon runners, the cutting apparatus and finger, the table and trip, and the guard for the heads of the stalks. These parts are of the specific construction described below, with such additions as may occur to the manufacturer, and such alterations as come within the spirit of my invention, and the proportions, sizes, and exact shapes of details are unessential.

*The main frame.*—This comprises (in the present instance) two runners 1, supporting a base 2, upon which is mounted a driver's seat 3, and the horse or team is hitched to a chain 4, that is connected to eyes 5 in the front end of said base or runners. The whole is preferably narrow in order that it may pass between two rows of corn, as will be understood, and therefore one horse is all that is usually necessary, the machine being light and easily drawn. For this reason, also, I have shown runners instead of wheels, although the latter could be used, if desired.

*The cutting apparatus.*—10 is the knife, which is a thin piece of steel or other metal, reversible end for end and having holes 11 through its body. 12 is a clamping-bar mounted upon the knife and having an outturned heel, and 13 are screws or bolts passing through this bar and through the holes in the knife into the base 2 in such manner as to hold the knife at an angle to the direction of movement, its heel being beyond the right runner, as shown. 14 is a rod, secured at its inner end to the base and pivoted at 15. On the downturned outer end of this rod is a finger 16, having its rear end beveled off, as at 17, behind its pivot. This finger stands in a plane below the knife and is a little less than four feet in length, its outer upper edge being beveled, as at 18, for a purpose to appear hereinafter. 19 is a strap secured on the base, with its outer end passing over the rear end of the finger to keep the latter in place. 20 is a catch pivoted at 21 to the base and having a downturned outer end 22, having a beveled outer face 23, adapted to pass behind the bevel 17 at the rear end of the finger, as seen in dotted lines in Fig. 1 and in full lines in Fig. 2. 24 is a stop-pin for this catch, and 25 is a fastening-pin adapted to pass through the catch and take into one of two holes 26 in the base, whereby the catch can be fastened either in engagement with the rear end of the finger or out of engagement therewith.

*The table.*—Hinged, as at 30, to the right runner below the plane of the cutting apparatus is a narrow table 31, whose rear end extends to the rear of the base, and secured thereto, as at 32, is a lever 33, extending across the machine, resting on the runners when the table is horizontal, (or on other supports, if wheels be used,) and carrying a downwardly-extending weight 34, adapted to return the lever and table to a horizontal position after it has been dumped. The inner or left end of this lever is notched, as at 35, and 36 is a spring-trip secured to an upright 2ª on the base and over which the notch passes in the descent of the lever. 37 is a foot-lever pivoted on the base convenient to the driver's foot and held by a stop-pin 38 and 39 is a cord or chain leading from this lever through a hole in the upright and connected with the trip.

*The guard.*—40 is a tubular upright near the right side of the base, and 41 is a set-screw taking through this upright against a rod 42, which rises out of the upper end thereof and is bent over to form horizontally-aligned eyes 43. Through the latter is journaled a rod 44, to whose outer end is connected a U-shaped guard of strong wire or rods, as 45, the mouth of this guard standing forward and directly above the table 31. The inner end of the rod 44 is cranked, as at 46, and tied into a hole 47 therein is a rope, cord, or chain 48, which leads down to the rear end 32 of the table outside of its hinge-line.

The operation: The knife is sharpened in the usual manner and is inserted under the clamping-bar and secured by the screws. The horse is attached and the machine driven over the road or elsewhere to the point where work is to be done, the finger being meanwhile turned in, as seen in Fig. 2, and the downturned end of the catch passed behind the rear end of the finger to hold the latter turned in while the fastening-pin is inserted in the forward hole to keep the catch in position. On arrival at the scene of the work the finger is turned out and locked, Fig. 1, the guard adjusted to the proper height according to the height of the stalks, and the cord 47 tied in such manner as to hold the guard horizontal when the table is also horizontal. One operator (who may be a boy) then takes his seat and drives the horse, guiding the machine properly to direct the stalks inside the finger and against the knife, and as the latter cuts them near the ground they pass at their butts over the finger, across the side bevel 18, and onto the table, while their tops are supported by the guard, as will be clear. At intervals the driver presses the foot-lever, and thereby draws in the trip, and the weight of the accumulated stalks on the table dumps the latter, so that the stalks can slide off onto the ground. This motion of the table draws on the cord 47 and tilts the guard, as seen in Figs. 2 and 3, to release the tops of the stalks. A second operator who at this time stands in proper position catches the stalks and bundles them in the well-known manner, or if the bundles or shocks are formed around a gallows-hill the finger can be temporarily turned in so as to pass this hill without cutting it, thereby avoiding the necessity for turning out in the course of the machine. As soon as the bundle slides off the table the latter returns automatically to its horizontal position under the influence of the weight and springs the trip to hold it there. While the machine passes on the second operator is forming the shock, after which he catches up with the machine in time to receive the next bundle; or there may be and preferably are two operators in addition to the driver, and they thus have more time for their work. If there be but one operator beside the driver, the two persons spell each other from time to time, and thus rest while driving. The guard is obviously adjusted by the set-screw, and the cord 47 must be tied to the crank properly to hold the guard horizontal, no matter how high or low it stands.

Having thus described my invention, what I claim as new is—

1. A cutting apparatus consisting of a reversible knife resting upon and oblique to a base, a bar removably secured upon said knife and having an outturned heel, a pivoted finger for directing the grain to the knife, and means for holding said finger in operative position or in position beneath the knife, as set forth.

2. A cutting apparatus consisting of a knife resting upon and oblique to a base, screws detachably connecting it thereto, a finger pivotally connected with said base at the heel of the knife and moving in a plane below the knife, and means for holding said finger at an angle to the knife to direct the grain thereto or in position beneath the knife to protect its cutting-edge, as set forth.

3. A cutting apparatus, in combination with a finger pivotally connected with the base at the heel of said apparatus and having a beveled rear end, a catch pivoted on said base and having a downturned free end with a beveled outer face, and a pin for locking said catch, as and for the purpose set forth.

4. A base, a cutting apparatus mounted thereon, and a table hinged to the base adjacent said apparatus, in combination with a weighted lever connected with said table and extending across the rear of the base, a trip for holding said lever in horizontal position, a foot-lever connected with the trip, a cranked rod journaled in a support, a guard carried by the rod, and a cord connecting said crank with the table, as and for the purpose set forth.

5. A base, a cutting device mounted thereon, a pivoted finger adjacent said device and having its outer upper edge beveled, and a catch for holding said finger in one of two positions, in combination with a table hinged to the base beneath the finger, a trip for the table, and a guard and connections therefrom to the table, all substantially as and for the purpose set forth.

6. A base and a cutting apparatus mounted thereon, in combination with a table hinged to the base adjacent the cutting apparatus, a lever connected to the table and leading across the base, an upright on the base, a spring-trip secured to said upright and adapted to engage the lever when the latter is lowered, a foot-lever pivoted on the base, a cord leading from the foot-lever through the upright and connected with said trip, a cranked rod journaled in a support, a guard carried by the rod, and a cord connecting said crank with the table, as set forth.

7. A base, a cutting apparatus mounted thereon, a table hinged to the base adjacent the cutting apparatus, and means for tripping said table, in combination with an upright on the base, a rod adjustable in said upright, a crank-shaft journaled through the rod and carrying a guard, and a cord adjustably connecting the table with the crank, as and for the purpose set forth.

8. A base, a cutting apparatus thereon, and a dumping-table, in combination with a tubular upright on the base, a set-screw therethrough, a rod therein, a crank-shaft journaled through the upper end of the rod, a U-shaped guard connected with this rod and standing above the table, and a cord connecting said crank and table, as set forth.

9. A base, a cutting apparatus thereon, and a dumping-table, in combination with a rod adjustably supported by the base and having its upper end turned over and provided with aligned eyes, a shaft journaled through said eyes and having a crank at its inner end and a U-shaped guard at its outer end, and a cord adjustably connecting said crank with the table, as and for the purpose set forth.

In testimony whereof I affix my signature in presence of two witnesses.

WILLIAM C. HOUSER.

Witnesses:
S. B. MESSENGER,
S. W. WARNER.